United States Patent Office 3,180,873
Patented Apr. 27, 1965

3,180,873
O-ORTHO(t-AMINOMETHYL PHENYL) NEUTRAL ESTERS OF PENTAVALENT PHOSPHORUS ACIDS
Karl-Julius Schmidt, Wuppertal-Vohwinkel, and Gerhard Schrader, Wuppertal-Cronenberg, Germany, assignors to Farbenfabriken Bayer Aktiengesellschaft, Leverkusen, Germany, a German corporation
No Drawing. Filed Dec. 28, 1962, Ser. No. 247,841
Claims priority, application Germany, Dec. 30, 1961, F 35,696
11 Claims. (Cl. 260—313)

The present invention relates to and has as its objects (thio)-phosphoric, -phosphonic or -phosphinic acid esters of 2-aminomethyl phenols substituted in 4-position as well as processes for the production of such compounds.

More specifically this invention is concerned with phosphoric, phosphonic, phosphinic or thiophosphoric, -phosphonic and -phosphinic acid esters of the general formula

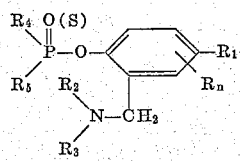

in which R means a hydrogen or halogen atom, a nitro or alkyl group, $R_1$ stands for a halogen atom, a nitro, alkoxy, alkylmercapto, alkylsulphoxyl or alkyl sulphonyl group, whilst $R_2$ and $R_3$ represent alkyl radicals or, together with the nitrogen atom, may form a heterocyclic 5- or 6-membered ring system, optionally interrupted by further hetero atoms such as O, S or N. $R_4$ and $R_5$ mean alkyl, aryl or alkoxy radicals or also dialkyl amino groups; finally, $n$ means a whole number from 1 to 3.

In accordance with the present invention it has been found that 2-aminomethyl phenols of the formula

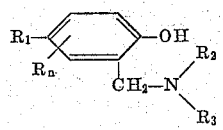

can be reacted with phosphoric, phosphonic, phosphinic or thionophosphoric, -phosphonic or -phosphinic acid halides, whereby compounds of the constitution as given above are obtained.

In the last mentioned formula the symbols R, $R_1$, $R_2$, $R_3$ and $n$ have the above significance.

The reaction according to the inventive process is carried out in the presence of acid-binding agents and preferably in the presence of inert organic solvents. As such, lower aliphatic ketones or nitriles as well as dimethyl formamide have proved particularly suitable, whilst as acid-binding agents alkali metal carbonates are especially to be considered.

It is, however, also possible to prepare first from the above-mentioned 2-aminomethyl phenols the corresponding alkali metal or ammonium salts and to react these with the (thiono)-phosphoric, -phosphonic or -phosphinic acid halides.

Furthermore, it has proved to be expedient to carry out the inventive reaction at slightly to moderately elevated temperatures (preferably 40 to 80° C.) and to heat the reaction mixture, after the starting components have been combined, for some more time (1 to 4 hours) with stirring.

The 2-aminomethyl phenols required as starting materials for the process according to the invention can be obtained by known methods in a Mannich-reaction from the corresponding phenols, susbtituted at least in 4-position, by reaction of the latter with formaldehyde and secondary amines in accordance with the following equation:

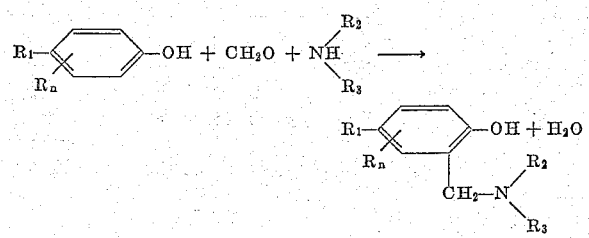

(cf. H. Hellmann and G. Opitz: "α-Aminoalkylierung," Weinheim 1960, p. 140 ff.).

The (thio)-phosphoric -phosphonic or -phosphinic acid esters obtainable according to the present invention are distinguished by excellent insecticidal properties.

The new compound very effectively kills insects like aphids, spider mites, caterpillars, flies, etc. They distinguish themselves especially by a very good contact-insecticidal activity and mostly also by a systemic and ovicidal action. At the same time they have an activity on eating insects such as caterpillars. Most surprisingly they are of remarkable low toxicity against mammals. For these reasons the inventive products are to be used as pest control agents, especially in plant protection. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers, etc.

As examples for the special utility the inventive compounds of the following formulae (I)

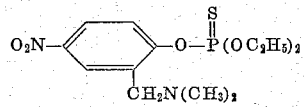

(II)

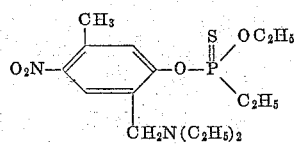

have been tested against aphids (compound II), spider mites (compound II), caterpillars (compound I) and flies (compounds I and II). Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs: The tests have been carried out as follows:

(a) Against aphids (species *Doralis fabae*): Heavily infested bean plants (*Vicia faba*) have been sprayed drip wet with solutions as prepared above. The effect has been determined after 24 hours by counting the dead pests either on the surface of the soil or still remaining on the plants. The following results have been obtained:

| Compound | Aqueous concentration (in percent active ingredient/water) | Killing rate (in percent) |
|---|---|---|
| II | 0.01 | 100 |

(b) Against spider mites: Bean plants (*Phaseolus vulgaris*) of about 15 inches height are sprayed drip wet with solutions as prepared above and in a concentration as shown below. The bean plants have been infested heavily with the two-spotted spider (species *Tetranychus telarius*). Evaluation has been carried out after 24 hours, 48 hours and 8 days. The following results have been obtained:

| Compound | Aqueous concentration (in percent active ingredient/water) | Killing rate (in percent) |
|---|---|---|
| II | 0.01 | ¹ 100 |

¹ Ovicidal activity.

(c) Against caterpillars of the type diamond black moth (*Plutella maculiphennis*): White cabbage has been sprayed drip wet with aqueous emulsions as prepared above in a concentration as shown below. Caterpillars (10 each) have been placed on the sprayed leaves of the white cabbage. The living status has been determined after 24 and 48 hours. The following results have been obtained:

| Compound | Aqueous concentration (in percent active ingredient/water) | Killing rate (in percent) |
|---|---|---|
| I | 0.001 | 100 |

(d) Against flies: About 50 flies (*Musca domestica*) are placed under covered petri dishes in which drip wet filter papers have been placed which are sprayed with insecticidal solutions of concentrations as shown below. The living status of the flies has been determined after 24 hours. The following results have been obtained:

| Compound | Aqueous concentration (in percent active ingredient/water) | Killing rate (in percent) |
|---|---|---|
| I | 0.001 | 100 |
| II | 0.001 | 100 |

The invention as claimed is illustrated in more detail by way of the following examples.

*Example 1*

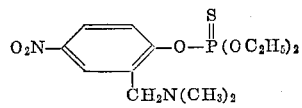

98 g. (0.5 mol) of 2-N,N-dimethylaminomethyl-4-nitrophenol (M.P. 140° C.) are dissolved in 250 cc. of acetonitrile. 70 g. of dried and powdered potassium carbonate are added to this solution with stirring. The mixture is subsequently heated for 30 minutes, whist stirring, at 60° C., then treated dropwise at the indicated temperature with 95 g. of O,O-diethylthionophosphoric acid chloride and heated for about 2 hours with further stirring at 80° C. After cooling, the reaction mixture is diluted with 500 cc. of benzene, 500 cc. of water are then added thereto, the mixture is shaken and the phases are separated. Finally, the benzene solution is washed several times with 100 cc. of water each time, then separated from the aqueous layer and dried over sodium sulphate. After the solvent has been removed under vacuum, 122 g. (70% of the theoretical yield) of the O,O-diethylthionophosphoric acid-O-(2-N,N-dimethylaminomethyl-4-nitrophenyl)-ester are obtained in the form of an orange coloured water-insoluble oil.

*Analysis.*—Calculated for $C_{13}H_{21}N_2O_5PS$ (molecular weight 348.4); P, 8.89%. Found: P, 8.84%.

Caterpillars and flies are completely destroyed by 0.001% solutions of the compound.

*Example 2*

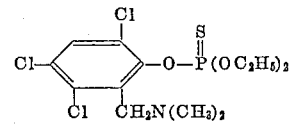

60 g. of screened and dried potassium carbonate are added with stirring to a solution of 102 g. (0.4 mol) of 2-N,N-dimethylaminomethyl-3,4,6-trichlorophenol (M.P. 90° C.) in 250 cc. of acetonitrile, 76 g. of the O,O-diethylthionophosphoric acid chlorides are subsequently added dropwise at 70° C. to the reaction mixture and the latter is heated for another 2 hours at 80° C. The mixture is then cooled to room temperature and subsequently worked up as described in Example 1. 185 g. (91% of the theoretical) of the O,O-diethylthionophosphoric acid-O-(2-N,N-dimethylaminomethyl-3,4,6-trichlorophenyl)-ester are obtained as a water-insoluble oil which, even under a high vacuum, cannot be distilled without decomposition.

*Analysis.*—Calculated for $C_{13}H_{19}Cl_3NO_3PS$ (mol. weight 406.7): P, 7.62%; S, 7.89%. Found: P, 7.88%; S, 8.31%.

Flies are killed to 95% by 0.001% solutions and spider mites are destroyed to 90% by 0.01% solutions of the ester. Moreover the compound shows an ovicidal activity against the eggs of spider mites.

*Example 3*

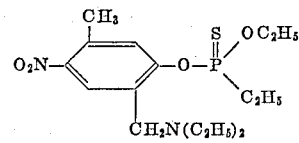

119 g. (0.5 mol) of 2-N,N-diethylaminomethyl-4-nitro-5-methylphenol (M.P. 116° C.) are dissolved in 250 cc. of acetonitrile, this solution is treated first with 70 g. of powdered and dried potassium carbonate and subsequently at 70° C. with 87 g. of ethyl-O-ethylthionophosphonic acid chloride. The reaction mixture is then heated for another 2 hours at 80° C. and worked up as described in the preceding examples. The ethyl-O-ethylthionophosphonic acid-O-(2-N,N-diethylaminomethyl-4-nitro-5-methylphenyl) ester is obtained in the form of a colourless water-insoluble oil. The yield amounts to 172 g. (92% of the theoretical).

*Analysis.*—Calculated for $C_{16}H_{27}N_2O_4PS$ (molecular weight 374.4): P, 8.27%; S, 8.56%. Found: P, 8.09%; S, 8.56%.

Flies are completely destroyed by 0.001% solutions, aphids and spider mites by 0.01% solutions of the ester. The compound also possesses an ovicidal activity against the eggs of spider mites.

Example 4

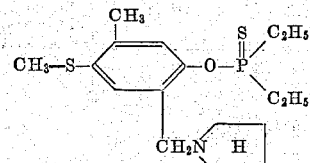

Under reaction conditions analogous to those described in Examples 1 to 3, there are obtained, from 95 g. (0.4 mol) of 2-pyrrolidinomethyl-4-methylmercapto-5-methylphenol and 63 g. of diethylthionophosphinic acid chloride, 132 g. (92.5% of the theoretical amount) of the diethylthionophosphinic acid - O-(2-pyrrolidinomethyl-4-methylmercapto-5-methylphenyl) ester as a colourless water-insoluble oil.

*Analysis.*—Calculated for $C_{17}H_{28}NOPS_2$ (molecular weight 357.5): P, 8.66%. Found: P, 8,27%.

Flies and aphids are killed to 90% by 0.1% solutions of the ester, spider mites are completely killed by 0.1% solutions.

Example 5

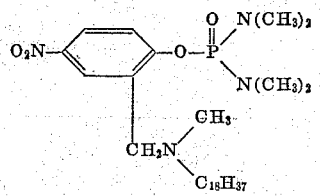

130 g. (0.3 mol) of 2-N-methyl-N-octadecylaminomethyl-4-nitrophenol (M.P. 62° C.) are dissolved in 250 cc. of acetonitrile. 45 g. of potassium carbonate are added to this solution, the reaction mixture is heated for 10 minutes at 70° C. and then treated dropwise, whilst stirring, with 52 g. of bis-(N,N-dimethylamino) phosphoric acid chloride. The mixture is subsequently heated for another 2 hours at 75 to 80° C. and then worked up as described in Example 1. 87 g. (99% of the theoretical yield) of the bis-(N,N-dimethylamino) phosphoric acid-O - (2-N-methyl-N-octadecyl-aminomethyl-4-nitrophenyl) ester are obtained as a water-insoluble oil.

*Analysis.*—Calculated for $C_{30}H_{57}N_4O_4P$ (molecular weight 568.8): P, 5.45%. Found: P, 5.44%.

Caterpillars are completely destroyed by 0.1% solutions of the ester.

The following compounds are obtained in an analogous manner.

| | Yield (percent of the theoretical) | Mol. weight | Analysis P | | Insecticidal properties | | |
| --- | --- | --- | --- | --- | --- | --- | --- |
| | | | Calc. (percent) | Found (percent) | Administration against | Concentration of active ingredient (in percent) | Killing rate (in percent) |
| $O_2N$—◯—O—P(S)(OC$_2$H$_5$)$_2$ ; CH$_2$N(C$_2$H$_5$)$_2$ | 90 | 376.4 | 8.23 | 8.22 | Caterpillars | 0.1 | 100 |
| Cl, $O_2N$—◯—O—P(S)(OC$_2$H$_5$)$_2$ ; CH$_2$N(C$_2$H$_5$)$_2$ | 90 | 410.9 | 7.54 | 7.50 | Caterpillars / Flies | 0.01 / 0.01 | 100 / 100 |
| NO$_2$, Cl—◯—O—P(S)(OC$_2$H$_5$)$_2$ ; CH$_2$N(C$_2$H$_5$)$_2$ | 98 | 410.9 | 7.54 | 7.62 | Flies / Beetles | 0.001 / 0.01 | 100 / 90 |
| NO$_2$, Cl—◯—O—P(S)(OC$_2$H$_5$)(C$_2$H$_5$) ; CH$_2$N(C$_2$H$_5$)$_2$ | 93 | 394.9 | 7.84 | 8.00 | Beetles / Flies | 0.01 / 0.001 | 100 / 100 |
| CH$_3$, $O_2N$—◯—O—P(S)(C$_2$H$_5$)$_2$ ; CH$_2$N(C$_2$H$_5$)$_2$ | 84.5 | 358.4 | 8.64 | 8.60 | Caterpillars / Aphids | 0.1 / 0.01 | 100 / 100 |
| Cl, $O_2N$—◯—O—P(S)(OC$_2$H$_5$)$_2$ ; CH$_2$N(CH$_3$)$_2$ | 93 | 382.8 | 8.09 | 8.35 | Aphids / Spider mites | 0.01 / 0.01 | 95 / ¹100 |
| CH$_3$, CH$_3$S—◯—O—P(S)(OC$_2$H$_5$)$_2$ ; CH$_2$N(CH$_3$)$_2$ | 81 | 363.5 | 8.52 | 7.83 | Caterpillars / Flies | 0.1 / 0.1 | 100 / 100 |
| $O_2N$—◯—O—P(S)(OC$_2$H$_5$)(C$_2$H$_5$) ; CH$_2$N(CH$_3$)$_2$ | 70 | 332.4 | 9.32 | 10.40 | Caterpillars / Flies | 0.001 / 0.001 | 100 / ¹100 |

| | Yield (percent of the theoretical) | Mol. weight | Analysis P | | Insecticidal properties | | |
|---|---|---|---|---|---|---|---|
| | | | Calc. (percent) | Found (percent) | Administration against | Concentration of active ingredient (in percent) | Killing rate (in percent) |
| 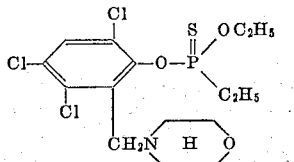 | 87 | 432.7 | 7.16 | 7.44 | Caterpillars <br> Aphids | 0.1 <br> 0.01 | 100 <br> 90 |
| 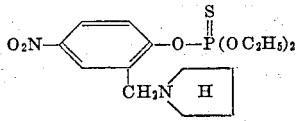 | 95 | 374.4 | 8.27 | 8.87 | Caterpillars <br> Aphids | 0.001 <br> 0.001 | 90 <br> 50 |
| 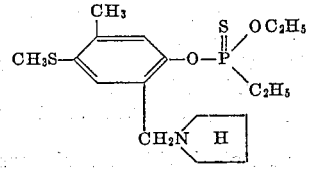 | 92 | 373.5 | 8.29 | 8.61 | Caterpillars <br> Aphids | 0.1 <br> 0.1 | 100 <br> 100 |
| 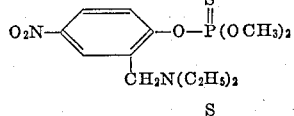 | 83 | 348.4 | 8.89 | 8.51 | Flies <br> Caterpillars | 0.01 <br> 0.01 | 100 <br> 100 |
| 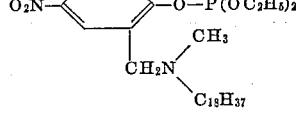 | 75 | 586.8 | 5.3 | 6.2 | Flies <br> Caterpillars | 0.001 <br> 0.001 | 100 <br> 100 |

[1] Ovicidal action.

We claim:

1. The compound of the following formula

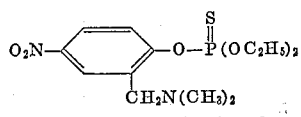

2. The compound of the following formula

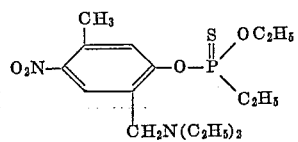

3. The compound of the following formula

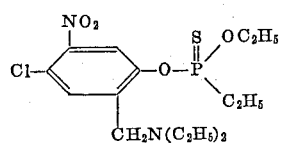

4. The compound of the following formula

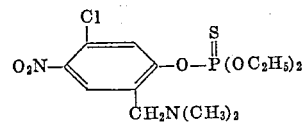

5. The compound of the following formula

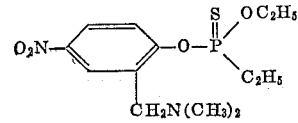

6. The compound of the following formula

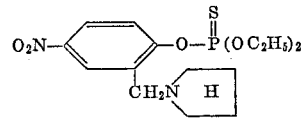

7. The compound of the following formula

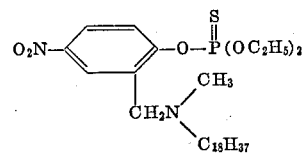

8. A compound of the formula

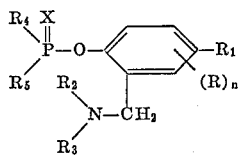

in which R stands for a member selected from the group consisting of hydrogen, halogen, nitro and lower alkyl having up to 4 carbon atoms, $R_1$ stands for a member selected from the group consisting of halogen, nitro and lower alkyl mercapto having up to 4 carbon atoms, $R_2$ stands for lower alkyl having up to 4 carbon atoms, $R_3$ stands for alkyl having up to 18 carbon atoms, $R_2$ and $R_3$ when taken together with N stands for a member selected from the group consisting of pyrrolidine and morpholine, $R_4$ and $R_5$ stand for members selected from the group consisting of lower alkyl, lower alkoxy and lower dialkylamino, the lower alkyl and lower alkoxy in each case having up to 4 carbon atoms, X stands for a member selected from the group consisting of oxygen and sulfur and $n$ stands for an integer of from 1 to 3.

9. A compound of the formula

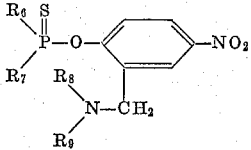

in which $R_8$ stands for lower alkyl having up to 4 carbon atoms, $R_9$ stands for alkyl having up to 18 carbon atoms and $R_6$ and $R_7$ stand for lower alkoxy having up to 4 carbon atoms.

10. A compound of the formula

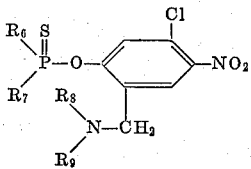

in which $R_8$ stands for lower alkyl having up to 4 carbon atoms, $R_9$ stands for alkyl having up to 18 carbon atoms, $R_6$ and $R_7$ stand for lower alkoxy having up to 4 carbon atoms.

11. A compound of the formula

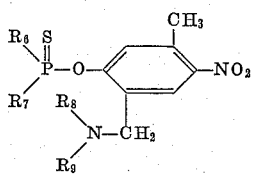

in which $R_8$ stands for lower alkyl having up to 4 carbon atoms, $R_9$ stands for alkyl having up to 18 carbon atoms, $R_6$ and $R_7$ stand for lower alkoxy having up to 4 carbon atoms.

No references cited.

IRVING MARCUS, *Primary Examiner.*
NICHOLAS S. RIZZO, *Examiner.*